(12) United States Patent
Ushiwata et al.

(10) Patent No.: US 6,971,298 B2
(45) Date of Patent: Dec. 6, 2005

(54) MITER SAW WITH LATERALLY TILTABLE CIRCULAR SAW BLADE

(75) Inventors: Shigeharu Ushiwata, Hitachinaka (JP); Hideaki Terashima, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 120 days.

(21) Appl. No.: 10/237,876

(22) Filed: Sep. 10, 2002

(65) Prior Publication Data
US 2003/0088986 A1     May 15, 2003

(30) Foreign Application Priority Data
Nov. 14, 2001   (JP)   .......................... P2001-348734

(51) Int. Cl.$^7$ ................................................ B27B 9/02
(52) U.S. Cl. ...................... 83/581; 83/471.3; 30/376; 144/216
(58) Field of Search .............................. 83/581, 471.3, 83/473, 490, 522.11, 522.15, 62.1, 472, 52.1, 83/591, 665, 666, 676; 30/376; 144/216, 144/217

(56) References Cited

U.S. PATENT DOCUMENTS

| | | | | |
|---|---|---|---|---|
| 4,028,975 A | * | 6/1977 | Bennett | ........................ 83/397 |
| 4,584,917 A | * | 4/1986 | Blom | .......................... 72/446 |
| 5,357,834 A | * | 10/1994 | Ito et al. | ..................... 83/471.3 |
| 5,425,294 A | * | 6/1995 | Ushiwata et al. | .......... 83/471.3 |
| 5,787,779 A | * | 8/1998 | Garuglieri | .................... 83/397 |
| 5,870,939 A | * | 2/1999 | Matsubara | ................. 83/471.3 |
| 6,330,848 B1 | * | 12/2001 | Nishio et al. | ................. 83/62.1 |
| 6,470,778 B1 | * | 10/2002 | Kaye et al. | .................... 83/100 |
| 6,561,069 B2 | * | 5/2003 | Krauss et al. | ................. 83/490 |

FOREIGN PATENT DOCUMENTS

| | | |
|---|---|---|
| JP | 2630537 | 4/1997 |
| JP | 2944889 | 8/1999 |

* cited by examiner

*Primary Examiner*—Timothy V. Eley
*Assistant Examiner*—Phong Nguyen
(74) *Attorney, Agent, or Firm*—Sughrue Mion, PLLC

(57) ABSTRACT

A miter saw including a base portion and a main body portion laterally tiltable and vertically pivotable. The main body portion includes a circular saw blade whose one side is provided with a power transmission mechanism. The mechanism includes a motor shaft pulley fixed to a motor shaft of a motor, a saw blade shaft extending in parallel with the motor shaft and an intermediate shaft extending in parallel with the saw blade shaft and positioned between the motor shaft and the saw blade shaft. On the saw blade shaft, a first saw blade shaft bearing, a flanged abutment portion, a gear and a second saw blade shaft bearing are arrayed in an order from the circular saw blade. On the intermediate shaft, a pinion meshedly engaged with the gear, a first intermediate shaft bearing in alignment with the second saw blade shaft bearing, an intermediate shaft pulley in alignment with the motor shaft pulley and a second intermediate shaft bearing are arrayed in this order from the circular saw blade. The gear and the pinion are positioned closest to the circular saw blade, which permits an axial thickness of the abutment portion to be reduced for reducing entire axial thickness of the power transmission mechanism.

3 Claims, 4 Drawing Sheets

MITER SAW WITH LATERALLY TILTABLE CIRCULAR SAW BLADE

BACKGROUND OF THE INVENTION

The present invention relates to a miter saw having a base and a circular saw blade vertically movable and laterally tiltable with respect to an upper surface of the base supporting a workpiece to be cut.

Japanese Patent Publication No.2630537 discloses such type of a miter saw with a simplified power transmission mechanism for transmitting a rotation of a motor shaft to a saw blade shaft. To this effect, a motor housing and a motor are provided at one side of the circular saw blade, and the motor shaft and the saw blade shafts extend to intersect with each other. The motor shaft is tapered such that a diameter of the motor shaft is gradually reduced toward the saw blade shaft, and further, a gear portion is formed at an outer surface of the motor shaft. On the other hand, the saw blade shaft is coaxially fixed with a bevel gear meshedly engageable with the gear portion of the motor shaft. A diameter of the bevel gear is gradually increased toward a direction away from the circular saw blade. A case is provided for covering the bevel gear and the motor shaft. The case includes a lower wall portion and a slant wall portion contiguous with the lower wall portion. The lower wall portion extends in parallel with the saw blade shaft and is positioned above the upper surface of the base supporting the workpiece when the circular saw blade is in a vertical orientation. The slant wall portion extends in parallel with the motor shaft and can be positioned above the upper surface of the base when the circular saw blade is tilted toward one side where the motor housing is positioned.

In case of cutting the workpiece while the circular saw blade is tilted to the one side, a thicker workpiece can be cut provided that the lower wall is positioned closer to the circular saw blade shaft and the slant wall portion is positioned closer to the motor shaft. However, the miter saw described in the Japanese patent publication No.2630537 employs the bevel gear for the power transmission. Therefore, an outer diameter of the bevel gear must disadvantageously be greater than an outer diameter of an ordinary spur gear in an attempt to provide a power transmission force by way of the bevel gear equal to a power transmission force by way of the spur gear, because a center area of the teeth of the bevel gear in its axial direction is considered to provide a mean or average level of a strength. Because the bulky bevel gear must be provided, the lower wall portion must be positioned spaced away from the circular saw blade shaft, and the slant wall portion must be positioned spaced away from the motor shaft. Consequently, resultant case becomes bulky.

Further, due to the orientation of the motor with respect to the saw blade shaft, the diameter of the bevel gear at the saw blade shaft is increased toward a direction away from the circular saw blade. Therefore, the lower wall portion must be positioned sufficiently below the saw blade shaft in accordance with the increase in the diameter of the bevel gear.

With such an arrangement, the slant wall portion immediately abuts against the workpiece if the circular saw blade is slanted to the one side. This becomes impossible to perform a slant cutting to a thick workpiece.

Japanese Patent publication No. 2964889 discloses the similar type of a miter saw in which a saw blade shaft and a motor shaft extend in parallel with each other, and pulleys are fixed to the saw blade shaft and the motor shaft, respectively, and a power transmission belt is mounted on the pulleys to provide a power transmission mechanism. However, in order to ensure a sufficient torque of the saw blade shaft for the purpose of cutting a workpiece, a large diameter of the pulley must be required for protecting the belt from its breakage. Then, a case for accommodating the power transmission mechanism must become bulky. Thus, the drawback the same as that in the miter saw of JP2630537 occurs.

In order to obviate the problem incurred in JP2630537, a miter saw shown in FIG. 5 has been provided. Incidentally, FIG. 5 shows a state where the circular saw blade is tilted rightwardly at an angle of 45 degrees. A saw blade holder 111 is positioned above a base (not shown) on which a workpiece is mounted. The saw blade holder 111 is supported by a support portion (not shown). The saw blade holder 111 is tiltable rightwardly or leftwardly and is movable vertically with respect to the base. A saw blade shaft 113 having a flanged abutment portion 113A is rotatably supported on the saw blade holder 111 through a saw blade shaft first bearing 114 and a saw blade shaft second bearing 115. The flanged abutment portion 113A is positioned between the first and second bearings 114 and 115 and has an axial thickness W.

A circular saw blade 18 is fixed coaxially with one end portion of the saw blade shaft 113, the one end portion being opposite to the flanged abutment portion 113A with respect to the first bearing 114. Further, a motor housing (not shown) is fixed to the saw blade holder 111. A motor having a motor shaft (not shown) is disposed in the motor housing. The motor shaft extends in parallel with the saw blade shaft 113 and is rotatably supported on the saw blade holder 111 through a bearing (not shown). A power transmission mechanism is provided in the sew blade holder 111 for transmitting rotation of the motor shaft to the saw blade shaft 113.

The power transmission mechanism includes a motor shaft pulley (not shown), an intermediate shaft 120, an intermediate shaft pulley 123, an endless belt 29, a pinion 120a and a gear 116. The motor shaft pulley is fixed to one end of a motor shaft (not shown). The intermediate shaft 120 extends in parallel with the saw blade shaft 113 at a position adjacent thereto. The intermediate shaft 120 is rotatably supported on the saw blade holder 111 through a first intermediate shaft bearing 122 and a second intermediate shaft bearing 121 spaced away from the first bearing 122 in the axial direction of the intermediate shaft 120. The intermediate shaft pulley 123 is fixed to one end of the intermediate shaft 120, and the endless belt 29 is mounted on the motor shaft pulley and the intermediate shaft pulley 123. Here, the first intermediate shaft bearing 122 is positioned adjacent to a first side surface of the intermediate shaft pulley 123, the first side surface being at a side of the circular saw blade 18. The second intermediate shaft bearing 121 is positioned at another end of the intermediate shaft, the another end being adjacent to the circular saw blade 18. Further, the second intermediate shaft bearing 121 is in direct confrontation with the abutment portion 113A of the saw blade shaft 113. The pinion 120a is formed over an outer surface of the intermediate shaft 120 and at a position between the first and second intermediate shaft bearings 122 and 121. Thus, the pinion 120a has a relatively small diameter. The gear 116 is fixedly provided coaxially with the saw blade shaft 113 and is in abutment with the abutment portion 113A. The gear 116 is positioned between the first and second saw blade shaft bearings 114 and 115 and is meshedly engaged with the pinion 120a. A diameter of the gear 116 is greater than that of the pinion 120a. The gear 116 and the pinion 120a provide a speed reduction mechanism.

Thus, on the saw blade shaft 113, the first saw blade shaft bearing 114, the flanged abutment portion 113A, the gear 116, and the second saw blade shaft bearing 115 are arrayed in this order from the circular saw blade 18, and on the intermediate shaft 120, the second intermediate shaft bearing 121 in alignment with the flanged abutment portion 113A, the pinion 120a in alignment with the gear 116, and the first intermediate shaft bearing 122 in alignment with the second saw blade shaft bearing 115 are arrayed in this order from the circular saw blade 18. The saw blade holder 111 has a lower wall portion 111A and a slant wall portion 111B those surrounding the above-described components.

With this structure, rotation of the motor is transmitted to the intermediate shaft pulley 123 through the motor shaft pulley and the endless belt 29 for rotating the pinion 120a having the relatively small diameter. Rotation of the pinion 120a is transmitted to the gear 116 having relatively large diameter for rotating the saw blade shaft 113. Thus, the circular saw blade 18 can be rotated at a higher torque through the speed reduction mechanism without any increase in diameters of the motor shaft pulley and the intermediate shaft pulley 123.

Further, because the gear 116 and the intermediate shaft pulley 123 are positioned close to the circular saw blade 18 as much as possible, a length X2 of the lower wall portion 111A in the axial direction of the saw blade shaft 113 can be decreased, which can increase a distance L2 between a lowermost point of the miter saw and the upper surface of a base 1A in case of the slanting orientation of the circular saw blade 18. Consequently, a thicker workpiece can be cut in case of the slant cutting.

A demand of improvement has been made on the conventional miter saw shown in FIG. 5 so as to increase a cutting thickness of the workpiece when the circular saw blade is slanted at an angle of 45 degrees. In order to meet with this demand, the position of the gear 116 should be shifted toward the circular saw blade 18.

SUMMARY OF THE INVENTION

However, according to the structure shown in FIG. 5, the second intermediate shaft bearing 121 is positioned closest to the circular saw blade 18 among the components on the intermediate shaft 120. Therefore, the abutment portion 113A in alignment with the second intermediate shaft bearing 121 must provide an axial width W corresponding to an axial width of the second intermediate shaft bearing 121, otherwise the gear 116 cannot be in alignment with the pinion 120a. Because the axial width W of the abutment portion 113A is approximately equal to the axial width of the second intermediate shaft bearing 121, the abutment portion 113A prevents the gear 116 from being positioned closer to the circular saw blade 18.

It is an object of the present invention to overcome the above-described problem and to provide a miter saw with a laterally tiltable circular saw blade capable of enhancing a cutting efficiency in case of the slanting orientation of the circular saw blade.

This and other objects of the present invention will be attained by a miter saw including a base portion, a main body, a main body support, a saw blade shaft, a pair of first and second saw blade shaft bearings, a circular saw blade, a motor housing, a motor, and a power transmission mechanism. A workpiece to be cut is held on the base portion. The main body has a lower wall and a slant wall continous with the lower wall. The main body support movably supports the main body with respect to the base portion laterally tiltably and vertically pivotably. The saw blade shaft has a flanged abutment portion. The second saw blade shaft bearing is spaced away from the first saw blade shaft bearing in an axial direction of the saw blade shaft. The first and second saw blade shaft bearings are supported on the main body for rotatably supporting the saw blade shaft. The flanged abutment portion is positioned between the first and second saw blade shaft bearings. The circular saw blade is fixed to one end of the saw blade shaft. The first saw blade shaft bearing is positioned adjacent the one end. The motor housing is fixed to the main body. The motor is disposed in the motor housing and has a motor shaft rotatably supported by the main body and extending in parallel with the saw blade shaft. The power transmission mechanism is disposed in the main body for transmitting a rotation of the motor shaft to the saw blade shaft. The power transmission mechanism includes a motor shaft pulley fixed to the motor shaft, an intermediate shaft, first and second intermediate shaft bearings, an intermediate shaft pulley, an endless belt, a pinion and a gear. The intermediate shaft is disposed adjacent to the saw blade shaft and extends in parallel therewith. The intermediate shaft has one end adjacent to the circular saw blade. The second intermediate shaft bearing is spaced away from the first intermediate shaft bearing in an axial direction of the intermediate shaft. The first and second intermediate shaft bearings are supported to the main body for rotatably supporting the intermediate shaft. The intermediate shaft pulley is fixed to the intermediate shaft and in alignment with the motor shaft pulley. The endless belt is mounted between the motor shaft pulley and the intermediate shaft pulley. The pinion is formed on the intermediate shaft at the one end portion thereof. The gear is coaxially fixed to the saw blade shaft and in abutment with the flanged abutment portion at a position in alignment with the pinion and in meshing relation therewith. The first intermediate shaft bearing is positioned beside the pinion, and the second intermediate shaft bearing is positioned at the another end of the intermediate shaft. The intermediate shaft pulley is positioned between the first and second intermediate shaft bearings. The lower wall extends in parallel with the saw blade shaft and the slant wall surrounding the second saw blade shaft bearing, the intermediate shaft pulley and the second intermediate shaft bearing.

In another aspect of the invention, there is provided a miter saw including the base portion, the main body, the main body support, a motor, a saw blade shaft, a circular saw blade, an intermediate shaft; a motor shaft pulley, first and second saw blade shaft bearings, a flanged abutment portion, a gear, a pinion, first and second intermediate shaft bearings, and an endless belt. The motor is supported by the main body and has a motor shaft. The saw blade shaft extends in parallel with the motor shaft and is rotatably supported by the main body. The circular saw blade is fixed to one end of the saw blade shaft. The intermediate shaft is rotatably supported by the main body. The intermediate shaft extends in parallel with the saw blade shaft and is positioned between the motor shaft and the saw blade shaft. The intermediate shaft has one end portion adjacent the circular saw blade. The motor shaft pulley is fixed to the motor shaft. The first saw blade shaft bearing is disposed on the saw blade shaft and is positioned beside the circular saw blade. The flanged abutment portion radially outwardly projects from the first saw blade shaft and is disposed beside the first saw blade shaft bearing. The gear is mounted on the first saw blade shaft and is positioned beside the flanged abutment portion. The second saw blade shaft bearing is disposed on the saw blade shaft and is positioned beside the gear and at the other end of the saw blade shaft. The pinion is formed on the one end portion of the intermediate shaft and in alignment with the gear for meshing engagement therewith. The first intermediate shaft bearing is mounted on the intermediate shaft and is positioned beside the pinion. The intermediate shaft pulley is mounted on the intermediate shaft and is positioned beside the first intermediate shaft bearing in alignment with the motor shaft pulley. The endless belt is mounted between the motor shaft pulley and the intermediate shaft pulley. The second intermediate shaft bearing is disposed on the other end portion of the intermediate shaft and beside the intermediate shaft pulley. The lower wall surrounds the first saw blade shaft bearing and the gear. The slant wall surrounds the second saw blade shaft, the intermediate shaft pulley and the second intermediate shaft bearing.

Because not the second intermediate shaft bearing but the pinion is positioned closest to the circular saw blade among the components on the intermediate shaft, the axial thickness of the abutment portion can be as small as possible as long as the abutment portion can sustain abutment against the gear when the gear is force fitted into the intermediate shaft. As a result, the axial thickness of the abutment portion can be reduced. Consequently, the gear can also be positioned close to the circular saw blade, which can reduce a length of a lower wall, the length being in parallel with the axial direction of the intermediate shaft. The reduction of the length can increase an effective cutting length between the upper surface of the base and the slanting wall, thereby enabling cutting to a thicker workpiece.

DETAILED DESCRIPTION OF THE PREFERRED EMBODIMENTS

Figure 1:
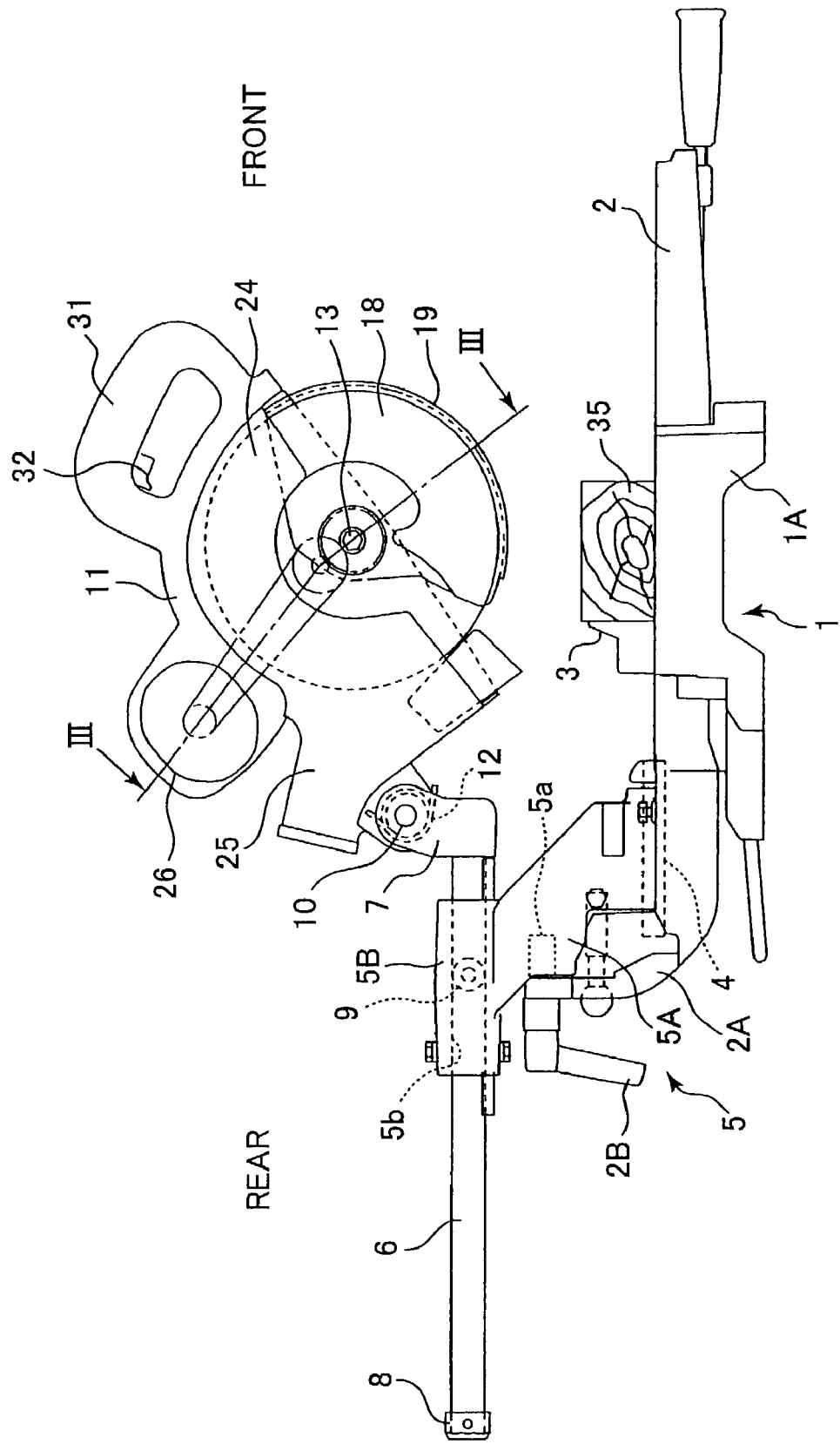
FIG. 1 is a side view showing a miter saw with a laterally tiltable circular saw blade according to one embodiment of the present invention.
Figure 2:
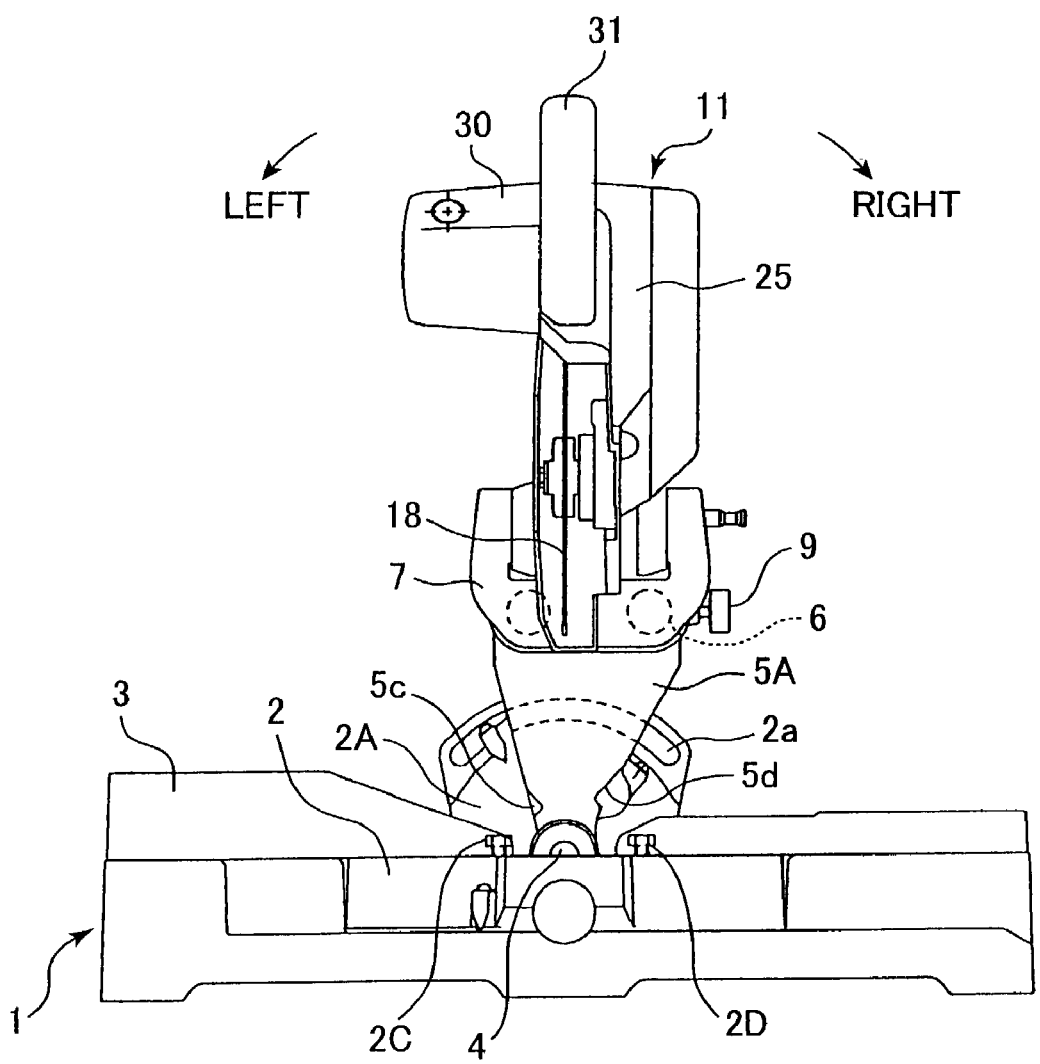
FIG. 2 is a front view of the miter saw according to the embodiment.

A miter saw having a mechanism for laterally tilting a circular saw blade according to one embodiment of the present invention will be described with reference to FIGS. 1 through 4. As shown in FIGS. 1 and 2, the miter saw generally includes a base portion 1 on which a workpiece 35 is mounted, a main body portion 11 adapted for cutting the workpiece 35, and a support portion 5 for movably supporting the main body portion 11 with respect to the base 1 in a vertical direction, in a frontward/rearward direction, and in a lateral direction, i.e., in rightward/leftward direction (FIG. 2).

The base portion 1 includes a base 1A and a turntable 2 rotatable on the base 1A in a horizontal plane. An upper surface of the turntable 2 is flush with an upper surface of the base 1A. The workpiece 35 such as a wood is mounted on the base 1A and the turntable 2. A fence 3 protrudes from the upper surface of the base 1A for positioning the workpiece 35 by abutting a vertical surface of the workpiece 35 with a vertical surface of the fence 3. A blade entry plate formed with a groove (not shown) is fixed to a center portion of the upper surface of the turntable 2. The blade entry plate is adapted for preventing a cut surface of the workpiece 35 from being nappy or fluffy by permitting a lowermost blade tip of a circular saw blade 18 (described later) to be entered into the groove when the lowermost blade tip is positioned lower than the upper surface of the turntable.

A holder shaft 4 extends in the frontward/rearward direction at a rear side of the turntable 2. The holder shaft 4 has an axis at a vertical position substantially coincident with the upper surface of the turntable 2. The support portion 5 includes a holder 5A whose lower end portion is pivotally movably supported on the holder shaft 4. Therefore, the holder 5A is laterally movable with respect to the base 1A about the holder shaft 4. The holder 5 has a rear side formed with a female thread hole 5a.

A holder support 2A protrudes vertically from the rear end portion of the turntable 2 for fixing a laterally tilting angle of the circular saw blade 18. The holder support 2A is formed with an arcuate slot 2a whose center of radius is coincident with the holder shaft 4. The arcuate slot 2a is at a position in alignment with the female thread hole 5a. A clamp lever 2B extends through the arcuate slot 2a. The clamp lever 2B has a tip end portion formed with a male thread portion threadingly engageble with the female thread hole 5a. Upon unfastening the clamp lever 2B to disengage the male thread portion from the female thread hole 5a, the holder 5A can be laterally tiltable about the holder shaft 4 within the length of the arcuate slot 2a. The arcuate slot 2a has a length capable of maximumly tilting the holder 5A at 45 angles in both rightward and leftward directions. If the clamp lever 2B is fastened while the holder 5A is tilted at a desired angle, the holder 5A can be fixed to the holder support 2A at the desirable tilting angle.

A stop portions 5c, 5d are formed at a front face of the holder 5A for regulating a laterally tilting angle of the holder 5A. Further, stop bolts 2C, 2D vertically extend from the upper rear surface of the turntable 2 at position on a moving locus of the stop portions 5c, 5d. The stop bolts 2C, 2D are threaded into the turntable 2. If the holder 5A is tilted in the lateral direction, the stop portion 5c or 5d is brought into abutment with the head of the stop bolt 2C or 2D, whereupon the tilting angle of the main body 11 can be set. Ordinarily, the stop bolts 2C, 2D are provided to laterally tilt the holder 5A at an angle of 45 degrees upon abutment with the stop portion 5c, 5d.

A pair of slide guide portions 5B are provided at a top of the holder 5A. The slide guide portions 5B are formed with a pair of through holes 5b extending in parallel with the upper surface of the turntable 2 and arranged side by side in a horizontal plane. A pair of guide bars 6 are reciprocally slidingly movably supported in the pair of through holes 5b. Thus, the guide bars 6 are positioned above the turntable 2 and are moved in parallel with the upper surface of the turn table 2 in the frontward/rearward direction by way of the slide guide portions 5B. The guide bars 6 have front end provided with a main body holder 7, and a rear end provided with a retainer 8 for avoiding a release of the guide bars 6 from the slide guide portions 5B. The slide guide portion 5B has a lateral side provided with a knob 9 for fixing and releasing the frontward/rearward position of the guide bars 6 with respect to the slide guide portions 5B.

The main body portion 11 is pivotally supported to an upper portion of the main body holder 7 through a shaft 10, so that the main body portion 11 can be vertically movable with respect to the upper surface of the base portion 1. A torsion spring 12 is interposed between the main body holder 7 and the main body 11 for pivotally urging the main body 11 upwardly.

The main body portion 11 will next be described in detail. The main body portion includes a gear case 25 serving as a circular saw blade holder. The gear case 25 is supported to the main body holder 7 and is pivotally movable about the shaft 10. A saw blade cover 24 is provided integrally with the gear case 25 for covering an upper half of the circular saw blade 18. Further, a handle 31 is provided integrally with a front portion of the gear cover 25. A switch 32 is provided to the handle 31 for driving a motor 26.

A saw blade shaft 13 is rotatably supported on the gear case 25 through a pair of first and second saw blade shaft bearings 14 and 15 spaced away from each other in the axial direction of the saw blade shaft 13. A flanged abutment portion 13A having a diameter greater than that of the saw blade shaft 13 is provided integrally therewith at an axially center portion. The abutment portion 13A has one end face in abutment with one end face of a race of the first bearing 14. The circular saw blade 18 is coaxially mounted on one end (left end in FIG. 4) of the saw blade shaft 13 at a position in confrontation with another end face of the race of the first bearing 14. A bolt 17 is threadingly engaged with the left end of the saw blade shaft 13 for fixing the circular saw blade 18. A safety cover 19 is pivotally supported to the gear cover 25 at a position around an outer peripheral surface of the first bearing 14 for protectively covering an outer peripheral edge and side face of the circular saw blade 18.

Figure 3:
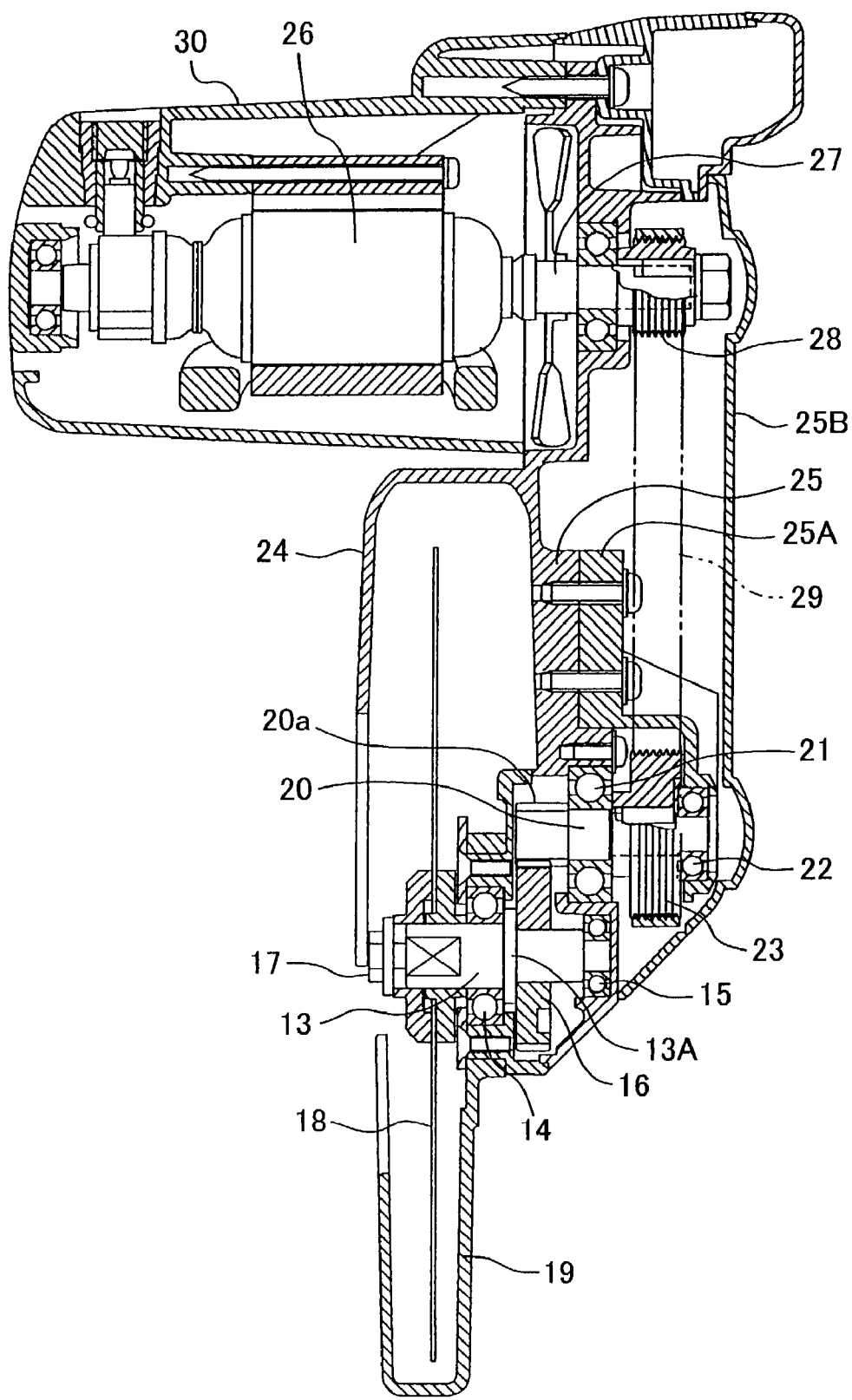
FIG. 3 is a cross-sectional view taken along the line III—III of FIG. 1.
Figure 4:
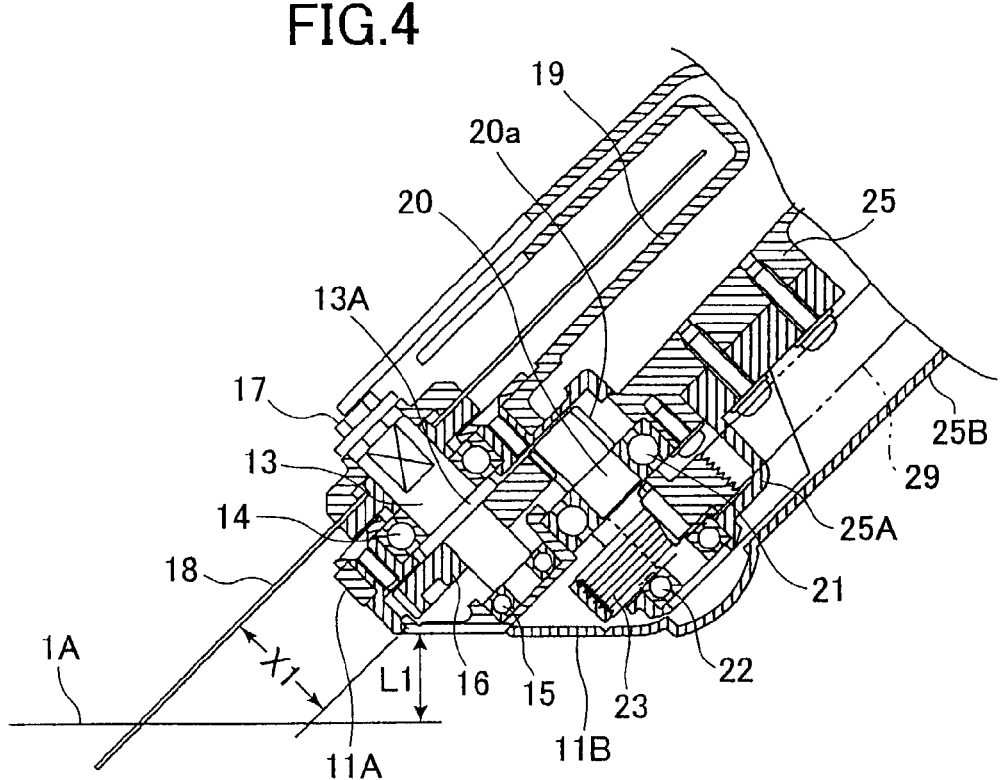
FIG. 4 is a cross-sectional view particularly showing a power transmission of the miter saw in which its circular saw blade is tilted rightwardly according to the embodiment.

As best shown in FIG. 3, a motor housing 30 is fixed to the gear cover 25 at a position intersecting with an imaginary plane containing a major plane (a disc portion) of the circular saw blade 18. The motor housing 30 houses therein the motor 26 which has a motor shaft 27 extending in parallel with the saw blade shaft 13 and supported rotatably on the gear case 25. The motor 26 and the motor housing 30 have positional relationship to the gear cover 25 such that the center of the gravity of the combination of the motor 26 and the motor housing 30 is positioned substantially in vertical alignment with the holder shaft 4 when the holder 5A is oriented in a vertical direction.

A power transmission mechanism is provided in the gear case 25 for transmitting the rotation of the motor shaft 27 to the saw blade shaft 13. The transmission mechanism includes a motor shaft pulley 28, an intermediate shaft 20, an intermediate shaft pulley 23, an endless belt 29, a pinion 20a, and a gear 16. The motor shaft pulley 28 is fixed to a tip end of the motor shaft 27. The intermediate shaft 20 is positioned close to and in parallel with the saw blade shaft 13 and is rotatably supported on the gear case 25 through a pair of first and second intermediate shaft bearings 21 and 22. These bearings 21 and 22 are spaced away from each other in the axial direction of the intermediate shaft 20. More specifically, the first intermediate shaft bearing 21 is fixed to the gear case 25 at a position in alignment with the second saw blade shaft bearing 15. On the other hand, the second intermediate shaft bearing 22 is disposed at a remote end of the intermediate shaft 20, the remote end being the remote end from circular saw blade 18 in comparison with a remaining end of the intermediate shaft 20. The second intermediate shaft bearing 22 is supported by a boss member 25A fixed to the gear case 25 in an overhanging fashion. That is, the boss member 25A holds an outer race of the second intermediate shaft bearing 22 to place the latter at a fixed position. The intermediate shaft pulley 23 is integrally rotatable with the intermediate shaft 20 and is disposed at a side opposite to the circular saw blade 18 with respect to the first intermediate shaft bearing 21. That is, the intermediate shaft pulley 23 is interposed between races of the first and second intermediate shaft bearings 21 and 22. The endless belt 29 is mounted on the motor shaft pulley 28 and the intermediate shaft pulley 23.

The pinion 20a is formed at an outer peripheral surface of the intermediate shaft 20 and at a side opposite to the intermediate shaft pulley 23 with respect to the first intermediate shaft bearing 21. In other words, the pinion 20a is positioned closest to the circular saw blade 18 among the components on the intermediate shaft 20. Because the intermediate shaft 20 is a member rotatable about its axis, two bearings such as the first and second intermediate shaft bearings 21 and 22 must be disposed spaced away from each other in the axial direction. Here, the second intermediate shaft bearing 22 is disposed at the remotest end of the intermediate shaft 20, the pinion 20a can be disposed at the other end, i.e., the closest end of the intermediate shaft 20 with respect to the circular saw blade 18. Thus, the close arrangement results between the pinion 20a and the circular saw blade 18.

The gear 16 is force-fitted with the saw blade shaft 13 until the gear 16 is brought into abutment with the abutment portion 13A. As a result, the gear 16 is rotatable together with the rotation of the saw blade shaft 13 and in alignment with the pinion 20a for meshing engagement therewith. Thus, on the saw blade shaft 13, the first saw blade shaft bearing 14, the abutment portion 13A, the gear 16 and the second saw blade shaft bearing 15 are arrayed in this order from the circular saw blade 18, and on the intermediate shaft 20, the pinion 20a aligned with the gear 16, the first intermediate shaft bearing 21 aligned with the second saw blade shaft bearing 15, the intermediate shaft pulley 23, and the second intermediate shaft bearing 22 are arrayed in this order from the circular saw blade 18. A gear case cover 25B is provided for housing the power transmission mechanism along with the gear case 25. The gear case 25 has a lower portion functioning as a lower wall 11A, and the gear case cover 25B has a lower portion functioning as a slant wall 11B.

Figure 5:
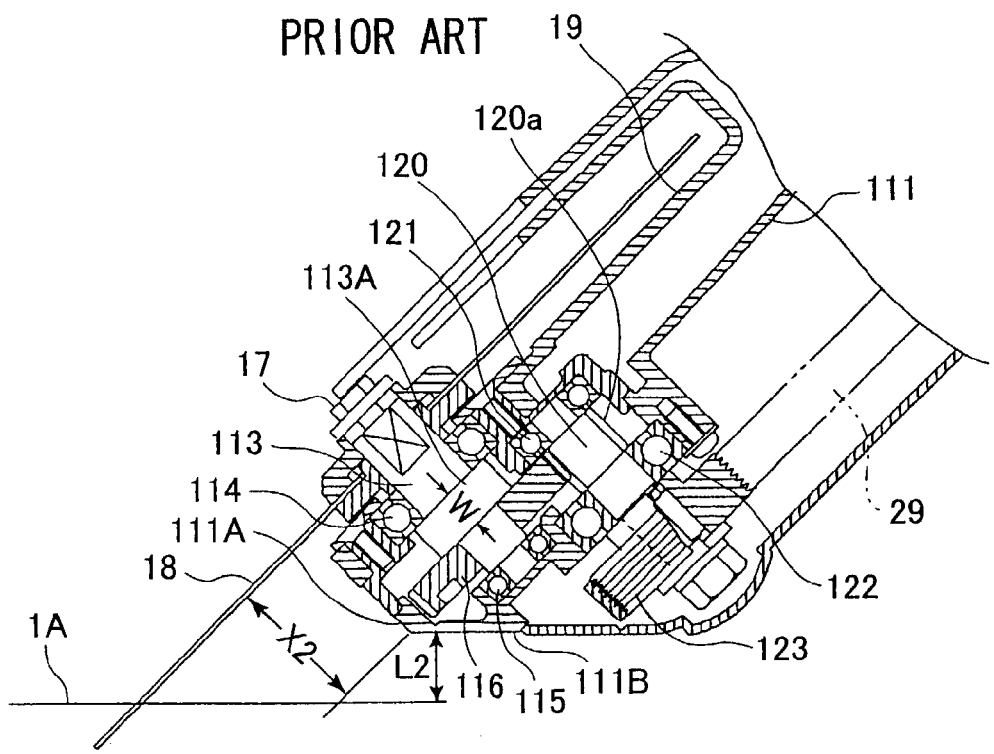
FIG. 5 is a cross-sectional view showing a power transmission of a conventional miter saw in which its circular saw blade is tilted rightwardly.

On the intermediate shaft 20, not the second intermediate shaft bearing 22 but the pinion 20a is disposed at the position closest to the circular saw blade 18. Therefore, the abutment portion 13A should only provide a mechanical strength capable of being in abutting relation to the gear 16 when the latter is force-fitted with the intermediate shaft 10. Thus, the axial thickness of the abutment portion 13A can be reduced. In other words, it is unnecessary to make the abutment portion 13A to have its axial thickness corresponding to the axial thickness of a component in alignment with the abutment portion 13A, since no substantial component is aligned with the abutment portion 13A contrary to the conventional aligning relation between the abutment portion 113A and the second intermediate shaft bearing 121 as shown in FIG. 5. Because the axial thickness of the abutment portion 13A can be reduced, the gear 16 on the intermediate shaft 20 can be positioned closer to the circular saw blade 18. As a result, a distance X1, i.e., the length of the lower wall portion 11A can be reduced. Consequently, effective cutting length L1 can be increased when the cutting is performed with slanting posture of the main body 11.

Even though the distance L2 (FIG. 5) is only slightly greater than the distance L1 (FIG. 4), such a small difference will provide a remarkably high utility. For example, in case of the conventional miter saw shown in FIG. 5, a workpiece having a maximum thickness of 15 mm can be cut in case of the employment of the circular saw blade 18 having a radius of 190 mm. On the other hand, in case of the miter saw shown in FIG. 4, a workpiece having a maximum thickness of 19 mm can be cut with the identical circular saw blade.

In operation, for laterally tilting the main body 11, the clamp lever 2B is unfastened for releasing the holder 5A. As a result, the holder 5A can be tilted rightwardly or leftwardly in FIG. 2. In this case, because the center of the gravity of the motor 26 and the motor housing 30 is in vertical alignment with the holder shaft 4 when the holder 5A is in vertical orientation, the main body 11 can be tilted with constant force regardless of the tilting direction.

If the holder 5A is tilted rightwardly in FIG. 2, the stop portion 5d is brought into abutment with the stop bolt 2D, so that the tilting angle of the main body 11 is set at 45 degrees. With this posture, the clamp lever 2B is fastened to fix the tilting position of the holder 5A. In this case, because the power transmitting portion provides a lesser rightwardly protruding bulk, the large distance L1 between the upper surface of the base 1A and the slant wall 11B of the main body portion 11 can be provided for improving cutting efficiency to the workpiece.

For cutting the workpiece, the motor 26 is energized upon pressing the switch 32 for rotating the motor shaft 27, whereupon the circular saw blade 18 is rotated through the pulley 28, the transmission belt 29, the intermediate shaft pulley 23 and the saw blade shaft 13. While maintaining this state, an operator grips the handle 31 and pushes the main body portion 11 downwardly against the biasing force of the spring 12. Thus, one end portion of the workpiece can be slantingly cut. After the circular saw blade 18 is entered into the groove of the blade entry plate (not shown) and cutting to the workpiece is completed, the operator pulls up the handle 11, so that the main body portion 11 can restore its original uppermost position by the biasing force of the spring 12.

Next, when the holder 5A is tilted leftwardly after the clamp lever 2B is unfastened for releasing the holder 5A, the stop portion 5c abuts against the stop bolt 2C so that the leftward tilting angle of the main body 11 is set at 45 degrees. With this posture, the clamp lever 2B is fastened to fix the tilting position of the holder 5A. Then, the workpiece 35 is shifted rightwardly on the base 1A, and cutting operation to the other end portion of the workpiece will be performed in a manner similar to the above.

Apparently, the main body portion 11 can be set in a vertical orientation for vertically cutting the workpiece 35. Further, a workpiece having a wide area can be subjected to vertical cutting, angled cutting and slant cutting by moving the main body portion 11 in the frontward/rearward direction. That is, the knob 9 is unfastened and the handle 31 is pulled frontwardly after the workpiece 35 is pressed against the fence 3. As a result, the main body portion 11 is moved frontwardly along with the main body holder 7, the guide bars 6 and the retainer 8. Then, the workpiece is cut while pushing the main body portion 11 rearwardly after the handle 31 is pressed downwardly. After cutting, the pushing-down force is reduced, so that the main body portion 11 is moved upwardly by the biasing force of the spring 12. In this way, composite cutting is achievable including vertical cutting, angled cutting and slant cutting.

While the invention has been described in detail with reference to specific embodiments thereof, it would be apparent to those skilled in the art that various changes and modifications may be made therein without departing from the spirit and scope of the invention. For example, in the depicted embodiment, the power transmission mechanism including the gear 16 and the pulley 23 is positioned at the right side (FIG. 3) of the circular saw blade 18. However, the power transmission mechanism can be positioned at the left side of the circular saw blade.

What is claimed is:

1. A miter saw comprising:

a base portion on which a workpiece to be cut is held;

a main body having a lower wall and a slant wall continous with the lower wall;

a main body support movably supporting the main body with respect to the base portion laterally tiltably and vertically pivotably;

a saw blade shaft having a flanged abutment portion, the saw blade shaft defining its axial direction and having one end and another end;

a pair of first saw blade shaft bearing and a second saw blade shaft bearing spaced away from the first saw blade shaft bearing in the axial direction of the saw blade shaft, the first and second saw blade shaft bearings being supported on the main body for rotatably supporting the saw blade shaft, the flanged abutment portion being positioned between the first and second saw blade shaft bearings;

a circular saw blade fixed to the one end of the saw blade shaft, the first saw blade shaft bearing being positioned adjacent the one end;

a motor housing fixed to the main body;

a motor disposed in the motor housing and having a motor shaft rotatably supported by the main body and extending in parallel with the saw blade shaft;

a power transmission mechanism disposed in the main body for transmitting a rotation of the motor shaft to the saw blade shaft, the power transmission mechanism comprising a motor shaft pulley fixed to the motor shaft;

an intermediate shaft disposed adjacent to the saw blade shaft and extending in parallel therewith, the intermediate shaft extending its axial direction and having one end adjacent to the circular saw blade and another end remote therefrom;

a first intermediate shaft bearing and a second intermediate shaft bearing spaced away from the first intermediate shaft bearing in the axial direction of the intermediate shaft, the first and second intermediate shaft bearings being supported to the main body for rotatably supporting the intermediate shaft;

an intermediate shaft pulley fixed to the intermediate shaft and in alignment with the motor shaft pulley;

an endless belt mounted between the motor shaft pulley and the intermediate shaft pulley;

a pinion formed on the intermediate shaft at the one end portion thereof; and a gear coaxially fixed to the saw blade shaft and in abutment with the flanged abutment portion at a position in alignment with the pinion and in meshing relation therewith, the first intermediate shaft bearing being positioned beside the pinion, and the second intermediate shaft bearing being positioned at the another end of the intermediate shaft, the intermediate shaft pulley being positioned between the first and second intermediate shaft bearings, the lower wall extending in parallel with the saw blade shaft and the slant wall surrounding the second saw blade shaft bearing, the intermediate shaft pulley and the second intermediate shaft bearing.

2. The miter saw as claimed in claim 1, further comprising a boss member fixed to the main body in an overhanging fashion for holding the second intermediate shaft bearing.

3. The miter saw as claimed in claim 1, wherein the circular saw blade has a disc portion and blade tips arranged on a peripheral portion of the disc portion, the motor housing being positioned intersecting with an imaginary plane including the disc portion.

* * * * *